United States Patent [19]

Hennuy et al.

[11] Patent Number: 4,913,338

[45] Date of Patent: Apr. 3, 1990

[54] PROCESS FOR PRODUCING A HEATING PLATE AND HEATING ARTICLE RELATING TO THIS

[75] Inventors: Jean Hennuy, Villefranche/Saone; Bernard Louison, St. Etienne, both of France

[73] Assignee: SEB S.A., Selongey, France

[21] Appl. No.: 291,449

[22] Filed: Dec. 27, 1988

[30] Foreign Application Priority Data

Dec. 30, 1987 [FR] France ................................ 8718379

[51] Int. Cl.[4] ............................................ B23K 31/02

[52] U.S. Cl. .............................. 228/173.1; 228/173.6; 228/174; 228/190; 228/254; 219/245; 219/254

[58] Field of Search ............... 228/182, 185, 190, 254, 228/173.1, 173.6, 174, 263.17; 219/245, 254

[56] References Cited

U.S. PATENT DOCUMENTS 1,979,631 11/1934 Maurer ................................ 219/254
2,361,874 10/1944 Russell .
3,275,801 9/1966 Churchill .
4,045,653 8/1977 Soper et al. .

FOREIGN PATENT DOCUMENTS 2151860 5/1972 Fed. Rep. of Germany .
635233 4/1950 United Kingdom .

*Primary Examiner*—Richard K. Seidel
*Assistant Examiner*—Samuel M. Heinrich
*Attorney, Agent, or Firm*—Young & Thompson

[57] ABSTRACT

A process for producing a heating plate involves fastening a tubular heating element (1) to a plate (2) made of metal or metal alloy. A plate (2) made of rolled metal or metal alloy is used, and cold-stamped in this plate is a shoulder (3), the contour of which corresponds substantially to the contour of the tubular heating element (1). The tubular heating element (1) is placed against the shoulder (3) and fastened to the plate by soldering. The thickness of the central part of the plate (2) is sufficient to withstand the thermal stresses which it must undergo. The process is especially useful for producing a heating sole of a steam-operated smoothing iron.

17 Claims, 3 Drawing Sheets

PROCESS FOR PRODUCING A HEATING PLATE AND HEATING ARTICLE RELATING TO THIS

Figure 1:
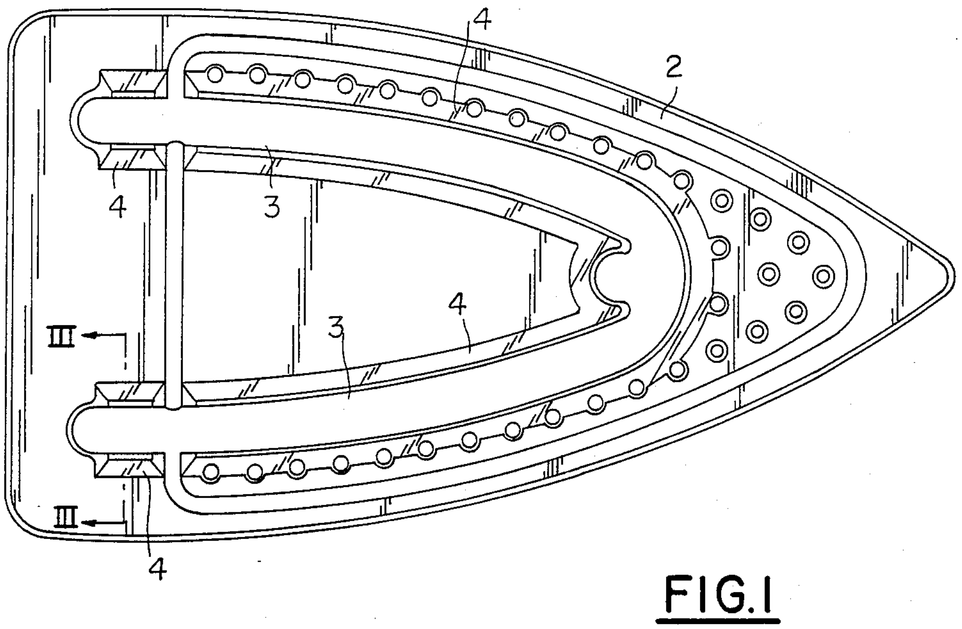

The present invention relates to a process for producing a heating plate, in which a tubular heating element is fastened to a plate made of metal or a metal alloy.

The invention is also concerned with heating articles which have a plane heating surface and which are obtained by the abovementioned process.

The invention applies particularly to the production of the soles of especially steam-operated smoothing irons.

Smoothing-iron soles are usually produced from cast aluminum. The heating element of these soles is generally composed of a metal tube bent substantially in the form of a U and containing compacted magnesium oxide which surrounds and electrically insulates an electrical resistor. This tubular heating element is embedded in the aluminum of the sole during the casting of the latter.

Because the heating element is embedded completely in the aluminum, the heat exchanges between this element and the sole are satisfactory. Moreover, it is found that, when the sole undergoes successive heating operations, its surface intended to be in contact with the articles to be smoothed remains substantially plane. This latter condition must be strictly adhered to in smoothing-iron soles and in all heating articles with a plane heating surface.

However, the abovementioned cast-aluminum soles have many disadvantages.

First of all, the technique for casting these soles has many disadvantages.

On the other hand, because the tubular heating element is embedded completely in the sole, the latter is relatively thick and therefore heavy.

Furthermore, the applicant found that it was impossible to apply to such cast soles a coating of enamel which, among other advantages, makes it possible to improve the sliding of the soles considerably.

The applicant attempted to overcome the disadvantages of the abovementioned known embodiments by trying to fasten a tubular heating element to a rolled (not cast) plate using the soldering technique. He nevertheless found that the temperatures employed during this soldering caused a deformation of the surface of the plate. Such deformation is unacceptable especially where smoothing-iron soles are concerned.

The applicant also found that the main cause of deformation of the rolled-aluminum soles was the influence of the repeated contact of the drops of cold water coming from the water tank intended for steam generation and falling at very short time intervals onto the hot surface of the sole.

In the region in question which extends over a radius of 10 to 15 mm about the point of impact of the water drops, there is contraction and expansion of the metal at the same rate as the falling frequency of the drops. In this region, the component metal of the sole, subjected to intense stress, creeps excessively and thereby produces two separate phenomena:

(a) if the sole is relatively thin (less than 7 to 8 mm where aluminum is concerned), there is considerable localized upward or downward or combined deformation in the region in question; in this case, the geometry of the sole is scarcely affected at all beyond this point.

This is because the forces exerted in this region cannot have any effect on the sole as a whole, the cross-sections of passage to the limiting region being insufficient to transmit the heat flows and the mechanical stresses, and therefore it is the inner part which yields and it is here that the deformations are localized.

(b) If the sole is thicker or has an increase in mass at the water falling point, this reinforcement, as a result of the increase in the passage cross sections, allows a distribution of the thermal and mechanical effects over a much larger region, thus making it possible to control the local deformations, but not preventing a general deformation of the sole always in the same direction.

The object of the present invention is to overcome the disadvantages of the abovementioned embodiments by providing a process which makes it possible to produce a heating plate, in particular a smoothing-iron sole which is economical and which remains essentially plane and can receive a coating, such as an enamel coating.

According to the invention, this process for producing a heating plate is defined in that what is used is a plate made of rolled metal or metal alloy which has, at least in its central region, a sufficient thickness to make it non-deformable under the effect of the thermal stresses which it must undergo, this thickness of the central region forming a shoulder, against which the tubular heating element is placed and fastened by soldering.

The shoulder formed by this sufficiently thick central region makes it possible to provide a contact surface between the heating resistor and the plate which is sufficient to ensure good heat-exchange conditions.

Furthermore, this central region of sufficient thickness prevents any risk of deformation of the plate under the effect of the thermal stresses, especially those generated as a result of the falling of drops of water onto a sole of a steam-operated smoothing iron.

Moreover, because a rolled plate is used, the cost of producing the heating plate is clearly more favorable than in respect of a cast plate encasing the heating element completely.

On the other hand, such a rolled plate can be covered with a coating of enamel or the like.

Furthermore, the heating plate according to the invention can be lighter than a cast plate, in which the heating element is embedded completely.

According to an advantageous version of the invention, a plate made of rolled aluminum or a rolled aluminum alloy is used.

Such a plate is highly suited to the cold-stamping and soldering operations.

According to one version of the process of the invention, in the plate is stamped a groove, the contour and width of which corresponds substantially to the contour and width of the tubular heating element, and the latter is placed in the groove and fastened in it by soldering.

Preferably, a groove of a depth of between 10 and 90% of the thickness of the rolled plate is made.

This groove preferably has a U-shaped cross-section. This form is perfectly suitable for receiving a tubular aluminum heating element having a flat and containing compacted magnesium oxide which surrounds an electrical resistor.

Preferably, during the stamping, a groove edged on each side by a rib projecting relative to the surface of the plate is made.

These ribs projecting on each side of the groove contribute to increasing the depth of fixing of the heating element in the groove and, above all, makes it possible to increase the rigidity of the plate and its resistance to deformation during the soldering operation.

According to one version of the process of the invention, a solder based on aluminum alloy is placed at the bottom of the groove, the tubular heating element is then placed on this solder, and the assembly as a whole is brought to a temperature of between 500° at 640° C. in order to melt the solder.

According to another version of the process of the invention, an aluminum plate having, on one of its faces, a film of aluminum-based solder co-rolled with this plate is used, the groove is cold-stamped on that face of the plate covered with the co-rolled solder film, the heating element is placed in the groove and the assembly as a whole is brought to a temperature of between 500° and 640° C. in order to melt the solder.

According to another version of the invention, the plate is formed by stamping under such conditions that produced in its central part is a region of a thickness greater than that of the initial plate and connected to the peripheral part by means of a shoulder, against which the tubular heating element is fastened by soldering.

This stamping method thus makes it possible at the same time to provide a reinforced central region which makes the plate non-deformable relative to the thermal stresses and produce a shoulder which makes it possible to obtain excellent heat exchange between the resistor and the plate.

According to a third version of the invention, the central part of a plate of substantially constant thickness is reinforced by a second plate, the peripheral edge of which forms a shoulder with the first plate, and the tubular heating element is fastened by soldering against the shoulder of the second plate.

As in the preceding embodiment, this attached second plate makes it possible to reinforce the central region of the first plate and provide the shoulder for fastening the heating resistor.

The process according to the invention applies preferably, but in a non-limiting way, to the production of a smoothing-iron sole.

Other particular features and advantages of the invention will also emerge from the following description.

Figure 2:
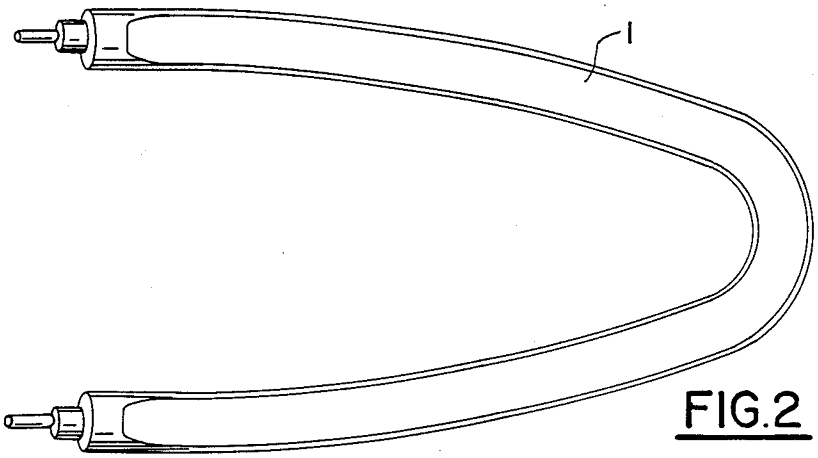
Figure 3:
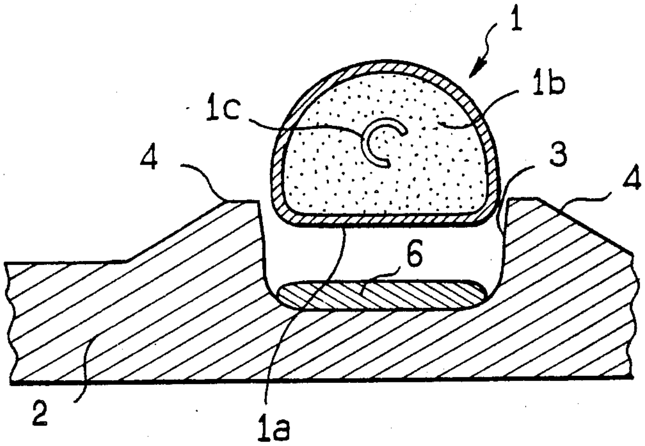
Figure 4:
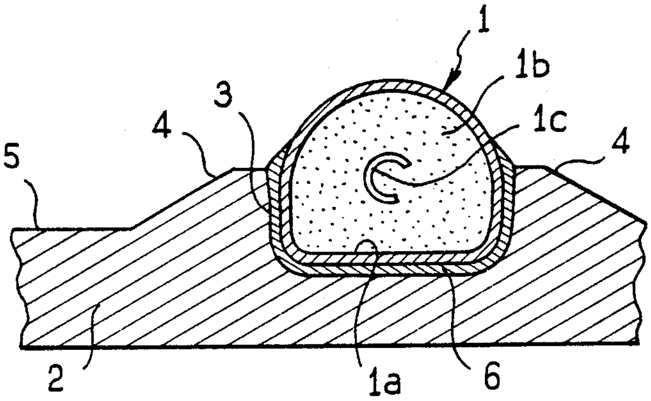
Figure 5:
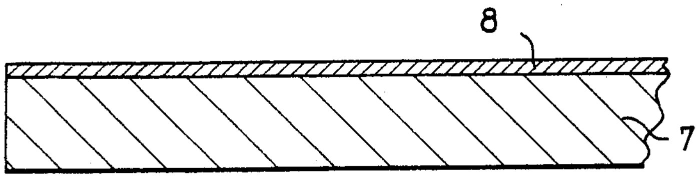
Figure 6:
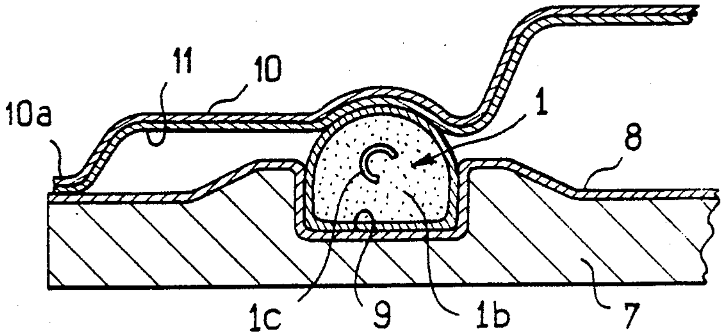
Figure 7:
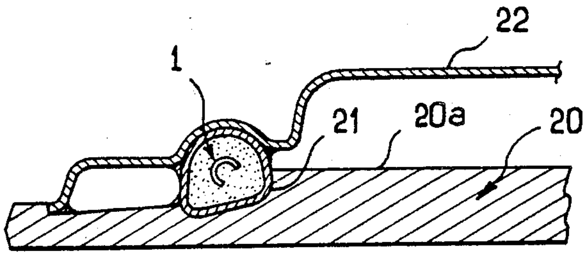
Figure 8:
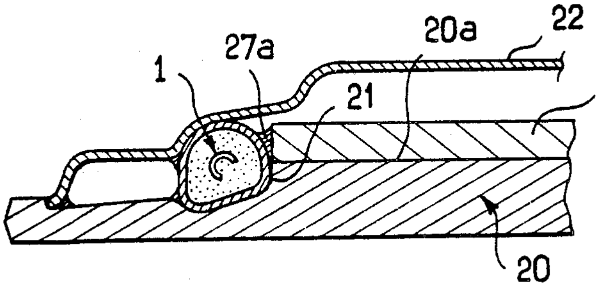
Figure 9:
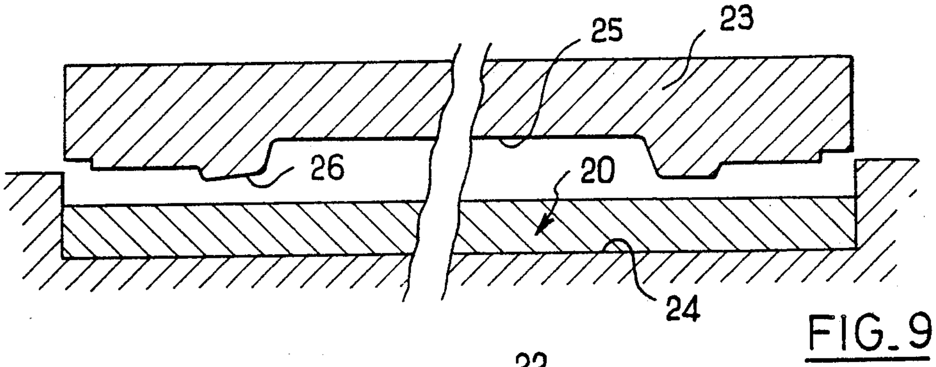
Figure 10:
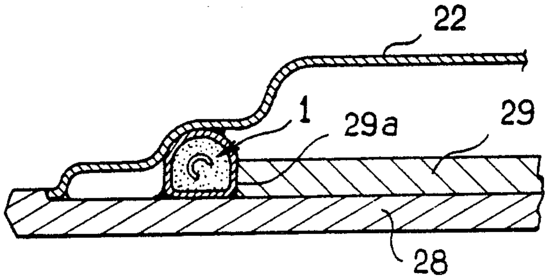
Figure 11:
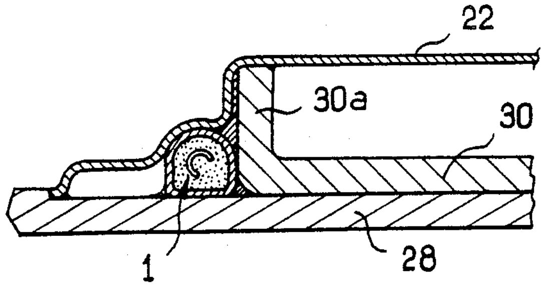

In the accompanying drawings given by way of non-limiting examples:

FIG. 1 is a plan view of a smoothing-iron sole having a cold-stamped, groove intended for receiving a heating element, FIG. 2 is a plan view of the heating element, FIG. 3 is a sectional view on an enlarged scale in the plane III—III of FIG. 1, after the solder has been put in place and showing the installation of the heating element (shown in cross-section), FIG. 4 is a view similar to that of FIG. 3, showing the heating element seated and soldered in the groove, FIG. 5 is a view in partial longitudinal section of a plate having a co-rolled solder film, FIG. 6 is a view in partial longitudinal section of a smoothing-iron sole obtained from the plate shown in FIG. 5, FIG. 7 is a view in partial longitudinal section of a smoothing-iron sole obtained according to another version of the process of the invention, FIG. 8 is a view similar to that of FIG. 7, illustrating an alternative version of the process, FIG. 9 is a sectional view showing the stamping punch used for producing the soles according to FIGS. 7 and 8, FIG. 10 is a view similar to those of FIGS. 7 and 8, illustrating another alternative version, FIG. 11 is a view similar to those of FIGS. 7, 8 and 9, illustrating another alternative embodiment.

FIGS. 1 to 4 illustrate a first version of the process for producing a heating sole for a smoothing iron, in which a tubular heating element 1 is fastened to a plate 2 made of metal or a metal alloy, such as an aluminum-based alloy.

According to this version of the process of the invention, a plate 2 made of rolled metal or metal alloy is used, and cold-stamped in this plate 2 is a groove 3, the contour and width of which corresponds substantially to the contour and width of the tubular heating element 1.

This stamping can be carried out cold or hot in a way known per se, for example by means of a hydraulic press and a die having the desired profile of the groove to be made.

After the stamping of the groove 3, the heating element 1 is placed in the latter and is fastened in this by soldering, as will be seen in more detail later.

According to requirements, a groove 3 of a depth of between 10 and 90% of the thickness of the rolled plate 2 is made.

In the example illustrated in FIGS. 3 and 4, the groove 3 has a U-shaped cross section matched to that of the tubular heating element 1. The latter has a flat 1*a* intended to come to rest on the bottom of the groove 3 and contains compacted magnesium oxide 1*b* surrounding an electrical resistor 1*c*.

As can be seen in FIGS. 3 and 4, during stamping a groove 3 edged on each side by a rib 4 projecting relative to the surface 5 of the plate is made. These ribs 4 are formed by creeping of the aluminum on each side of the stamped groove 3.

In the example shown in FIG. 3, before the heating element 1 is installed, a solder 6 based on aluminum alloy is placed at the bottom of the groove 3. After the tubular heating element 1 has been placed on this solder 6, the assembly as a whole is brought to a temperature of between 500° and 640° C. in order to melt the solder.

During this soldering operation, the solder 6 fills the entire space located between the heating element 1 and the groove 3, as shown in FIG. 4. Furthermore, this solder 6 rises partially on the upper surface of the heating element 1 as a result of a capillarity effect, so that the latter is firmly joined to and in intimate contact with the sole 2.

To make soldering easier, the interior of the groove 3 and the heating element 1 are treated by means of a flux. This flux can be of the corrosive or non-corrosive type.

Of the corrosive fluxes, it is possible to use the alkaline chlorides (ClNa, ClK, ClLi) or alkaline-earth chlorides ($Cl_3Ca$, $Cl_2Mg$). Of the non-corrosive fluxes, mention will be made for preference of cryolite ($Na_5AlF_6$).

The flux can be applied by coating, immersion or spraying in the form of a solution or suspension.

Of course, the solder used must be of an alloy of a melting point below those of the sole and of the heating element.

If the sole 2 is made of aluminum containing a low proportion of Si, Fe, Cu and other metals, the aluminum solder used will contain a few per cent of Si, its melting point being between 550° and 620° C.

In the version of the process illustrated in FIGS. 5 and 6, an aluminum plate 7 having, on one of its faces, a film 8 of aluminum-based solder co-rolled with this plate, is used. The groove 9 is cold-stamped on that face of the plate 7 covered with the co-rolled solder film 8, the heating element 1 is placed in the groove and the assembly as a whole is brought to a temperature between 500° and 600° C. in order to melt the solder 8.

In the example illustrated in FIG. 6, after the heating element 1 has been installed in the groove 9 stamped in the sole 7, that face of the latter having the heating element 1 is covered with a cap 10 so as to form a vaporization chamber within the latter. The edge 10*a* of the cap 10 is fastened by soldering to the sole 7 and the heating element 1 is fastened by soldering to the bottom of the groove 9 in a single operation.

For this purpose, the cap 10, like the sole 7, can be composed of a film of aluminum co-rolled with a film 11 of aluminum-based solder. This cap 10 can at the same time be joined to the upper part of the heating element 1, as shown in FIG. 6.

A numerical example of the implementation of the process for producing a smoothing-iron sole is given below.

A plate made of rolled aluminum of a thickness equal to 4 mm, covered with a solder film co-rolled with the plate, is used.

In this example, the aluminum of the plate contains 0.6% Si, 0.7% Fe, 0.05 to 0.20% Cu, 1 to 1.5% Mn and 0.1% Zn. The melting temperature of this alloy is equal to 643° C.

The thickness of the solder film co-rolled with this plate is equal to 0.4 mm. The aluminum-based alloy of this film contains 6.8 to 8.2% Si, 0.8% Fe, 0.25% Cu, 0.10% Mn and 0.2% Zn. The melting temperature of this alloy is between 577° and 617° C.

A groove of a depth equal to 2 mm is cold-stamped on this plate by using a hydraulic press. The pressure exerted is between 650 and 700 tons. The shape of the die is designed so that the stamping forms ribs of a thickness equal to approximately 2 mm on the edges of the groove.

The stamped sole is subsequently immersed in a bath of flux (alkali or alkaline-earth metal chloride or fluoride).

A tubular aluminum heating element containing compacted magnesium oxide surrounding an electrical resistor is then placed in the groove.

A cap produced from a stamped aluminum film which, if appropriate, can include a co-rolled solder film, is placed above the tubular heating element. This tubular heating element and this cap have been treated with a flux, in the same way as the sole.

The assembly as a whole is then placed in an oven, in which a temperature of between 595° and 620° C. prevails.

The main advantages of the process just described are as follows:

On the one hand, because the sole is produced from a stamped rolled plate, its production cost is markedly lower than that of a cast sole.

Furthermore, because of the stamped groove, the heating element has a large surface of heat exchange with the sole.

Moreover, it is found that this groove makes it possible to prevent any deformation of the sole attributable to the temperatures employed during soldering, despite the differences in the coefficients of expansion between the sole and the heating element.

The process according to the invention makes it possible to fasten the heating element and the cap to the sole simultaneously (that is to say, in a single soldering operation), at the same time ensuring a sealed junction between the sole and the cap, thus making the process even more economical.

In addition, experience has shown that an enamel coating adhered perfectly to the surface of the rolled-aluminum sole, thus making it possible to ensure sliding, ease of cleaning and an esthetic appearance which are markedly improved in comparison with cast soles.

In the version of the process illustrated in FIGS. 7 to 9, the rolled-aluminum plate 20 is formed by stamping under such conditions that a region of a thickness greater than that of the initial plate, as shown in FIG. 9, is produced in a central part 20*a*. This central part of extra thickness 20*a* is connected to the peripheral part 20*b* by means of a shoulder 21, against which the tubular heating element 1 is fastened by soldering, as explained above.

As in the example shown in FIG. 6, the fastening of a cap 22 is carried out by soldering at the same time as that of the heating element 1.

FIG. 9 shows the stamping punch 23 used for stamping the plate 20. This is fitted into a die 24. The punch 23 has a central cavity 25 which matches the extra thickness to be provided on the plate 20 and edged by a relief 26 corresponding to the location of the heating element 1. The punch 23 is pressed onto the plate 24 under sufficient pressure to cause the material of the periphery to creep towards the central part.

This results, by way of example, in a plate 20 having a thickness equal to 7 mm in its central part and a thickness reduced to 3 mm in its peripheral part, whereas the initial plate 20 had a constant thickness of approximately 5 mm.

Experience has shown that, as a result of this extra thickness in its central part, a sole of a steam-operated smoothing iron, produced according to the abovementioned process, withstands without deformation the impact of the drops of cold water which occurs in this central region.

In the embodiment of FIG. 8, the central region 20*a* is further reinforced by the addition of a plate 27 which is in intimate contact with the plate 20 and the peripheral edge 27*a* of which is in line with the shoulder 21 formed in the underlying plate 20. The effect of this plate 27 is therefore to increase the height of the shoulder 21, against which the heating element 1 is fastened, thus improving the heat-exchange conditions between the latter and the plate 20.

In view of the reinforcement provided by the second plate 27, the maximum thickness of the first plate 20 can be less than that of the plate 20 shown in FIG. 7.

This second plate 27 can have a co-rolled solder film which makes it possible to fasten this plate to the first plate 20 by soldering.

In the version shown in FIG. 10, the plate 28 has a substantially constant thickness. Attached to this plate 28 is a second plate 29, the peripheral edge 29*a* of which forms the shoulder, against which the heating element 1 is fastened by soldering.

The effect of this second plate 29 is to increase the thickness of the metal in the central part of the sole, thus allowing the latter to withstand the thermal stresses generated as a result of the impact of the drops of cold water.

As an example, the plates 28, 29 can both have a thickness of the order of 4 mm when they are made of rolled aluminum.

The plate 29 could, if appropriate, be produced from a metal other than aluminum and thus have a coefficient of thermal expansion slightly different from that of the plate 28, in order to compensate by a bimetallic strip effect the deformations which are induced in the plate 28.

The embodiment according to FIG. 11 provides two improvements in relation to that of FIG. 10.

On the one hand, the edge 30*a*, bent at 90°, of the plate 30 laid against the plate 28 forms a peripheral beam which allows this plate 30 to withstand the deformations to an even greater extent.

On the other hand, this bent edge 30*a* forms a shoulder of greater height for the heating element 1, thus making it possible to improve the thermal contact between this element and the underlying plate 28.

Moreover, the bent edge 30*a* of the plate 30 serves as a support for the cap 22 and makes it possible to increase the height of the vaporization chamber located between the plate 30 and this cap 22.

Of course, the invention is not limited to the examples just described, and many modifications can be made to these, without departing from the scope of the invention.

Thus, the invention can also be used for producing heating articles having a plane surface other than smoothing-iron soles. In these articles, the heating element, instead of containing an electrical resistor, can be composed of a tube, in which a heat-exchange fluid, such as hot water, circulates.

Of course, the various soldering operations which have just been described can be carried out under a vacuum, thus making it possible to avoid the disadvantages associated with the use of a corrosive flux and making it possible to obtain clean surfaces directly capable of receiving a coating.

We claim:

1. A process for producing a heating plate, in which a tubular heating element (1) is fastened to a plate (2, 20, 28) made of metal or metal alloy, wherein the plate (2, 20, 28)is made of rolled metal or metal alloy which has, at least in its central region, a sufficient thickness to make it non-deformable under the effect of the thermal stresses which it must undergo, this thickness of the central region forming a shoulder (3, 21, 29*a*, 30*a*), against which the tubular heating element (1) is placed and fastened by soldering.

2. The process as claimed in claim 1, wherein a groove (3) is stamped in the plate (2), the contour and width of which corresponds substantially to the contour and width of the tubular heating element (1), and the tubular heating element is placed in the groove (3) and fastened in the groove by soldering.

3. The process as claimed in claim 1, wherein the plate (2,20,28) is made of rolled aluminum or aluminum alloy.

4. The process as claimed in claim 2, wherein the groove (3) has a depth of between 10 and 90% of a thickness of the rolled plate (2).

5. The process as claimed in claim 2, wherein the groove (3) has a U-shaped cross section.

6. The process as claimed in claim 2, wherein the tubular aluminum heating element (1) has a flat (1*a*) and contains compacted magnesium oxide (1*b*) surrounding an electrical resistor (1*c*).

7. The process as claimed in claim 2, wherein, during stamping, the groove (3) is edged on each side by a rib (4) projecting relative to the surface (5) of the plate (2).

8. The process as claimed in claim 2, wherein a solder (6) based on aluminum alloy is placed at the bottom of the groove (3), the tubular heating element (1) is then placed on this solder and the assembly as a whole is brought to a temperature of between 500° and 640° C. in order to melt the solder (6).

9. The process as claimed in claim 3, wherein the aluminum plate (7) has on one of its faces, a film (8) of aluminum-based solder co-rolled with this plate, the groove (9) is cold-stamped on that face of the plate covered with the co-rolled solder film (8), the heating element (1) is placed in the groove (9) and the assembly as a whole is brought to a temperature of between 500° and 640° C. in order to melt the solder (8).

10. The process as claimed in claim 8, wherein, before the heating element (1) is installed in the groove, the surface of the solder is treated by means of a soldering flux.

11. The process as claimed in claim 10, wherein, after the heating element (1) has been installed in the groove stamped in the plate, that face of the plate having the heating element is covered with a cap (10), so as to form a vaporization chamber within the cap, and the edge (10*a*) of the cap (10) is fastened by soldering to the plate and the heating element (1) is fastened by soldering to the bottom of the groove (9) in a single operation.

12. The process as claimed in claim 1, wherein the plate (20) is formed by stamping under such conditions that a region of a thickness greater than that of the initial plate and connected to the peripheral part of the plate by means of a shoulder (21), against which the tubular heating element (1) is fastened by soldering, is produced in its central part (20*a*).

13. The process as claimed in claim 12, wherein the central part (20*a*) of greater thickness is reinforced by a second plate (27) extending to the shoulder (21) formed in the first plate (20), and the tubular heating element (1) is fastened by soldering against the shoulder (21) of the first plate and the edge (27*a*) of the second plate (27).

14. The process as claimed in claim 13, wherein the second plate (27) has a co-rolled solder film which makes it possible to fasten this plate to the first plate (20) by soldering.

15. The process as claimed in claim 1, wherein the central part of a plate (28) of substantially constant thickness is reinforced by a second plate (29, 30), the peripheral edge (29*a*, 30*a*) of the second plate forms a shoulder with the first plate (28), and the tubular heating element (1) is fastened against the shoulder of the second plate (29, 30) by soldering.

16. The process as claimed in claim 14, wherein the second plate (30) has a peripheral edge (30*a*) bent upwards at 90° , and the tubular heating element (1) is fastened against said bent edge (30*a*) of the second plate (30) by soldering.

17. The process as claimed in claim 1, which is used for producing a sole of a steam-operated smoothing iron.

* * * * *